Edward S. Robbins INVENTOR.

March 18, 1958  E. S. ROBBINS  2,826,783
QUICK ACTING TIRE RETREADING MOLD
Filed Nov. 22, 1954  5 Sheets-Sheet 2
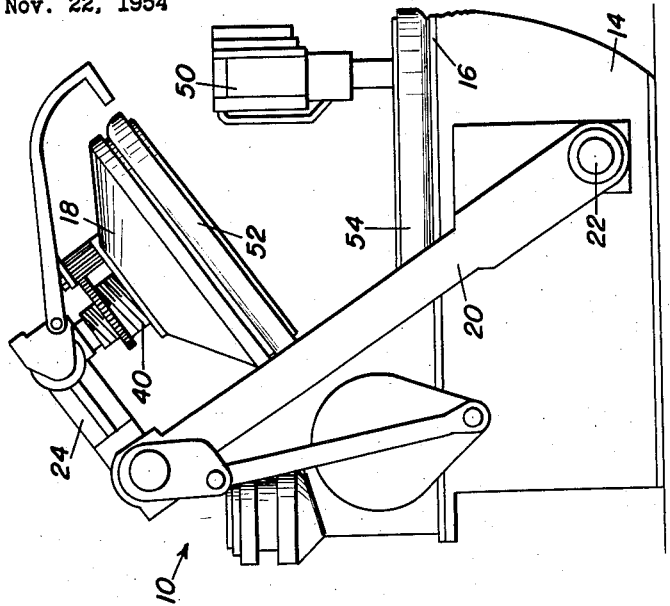
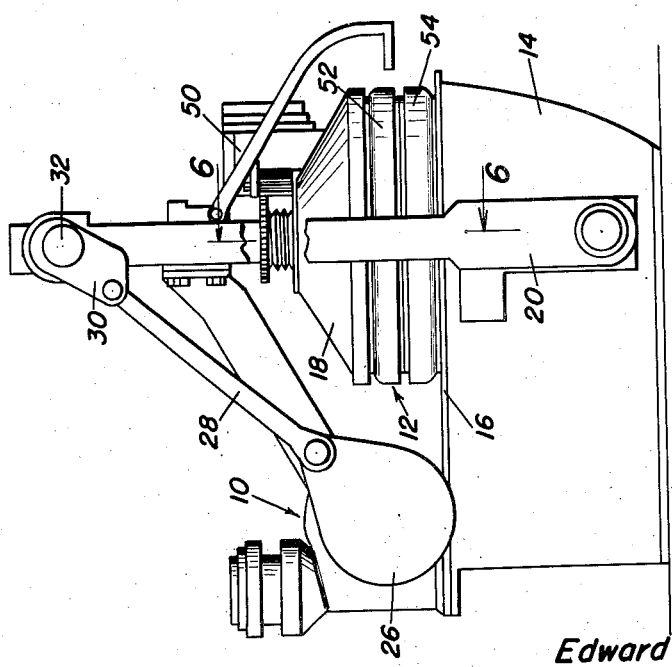
Edward S. Robbins
INVENTOR.

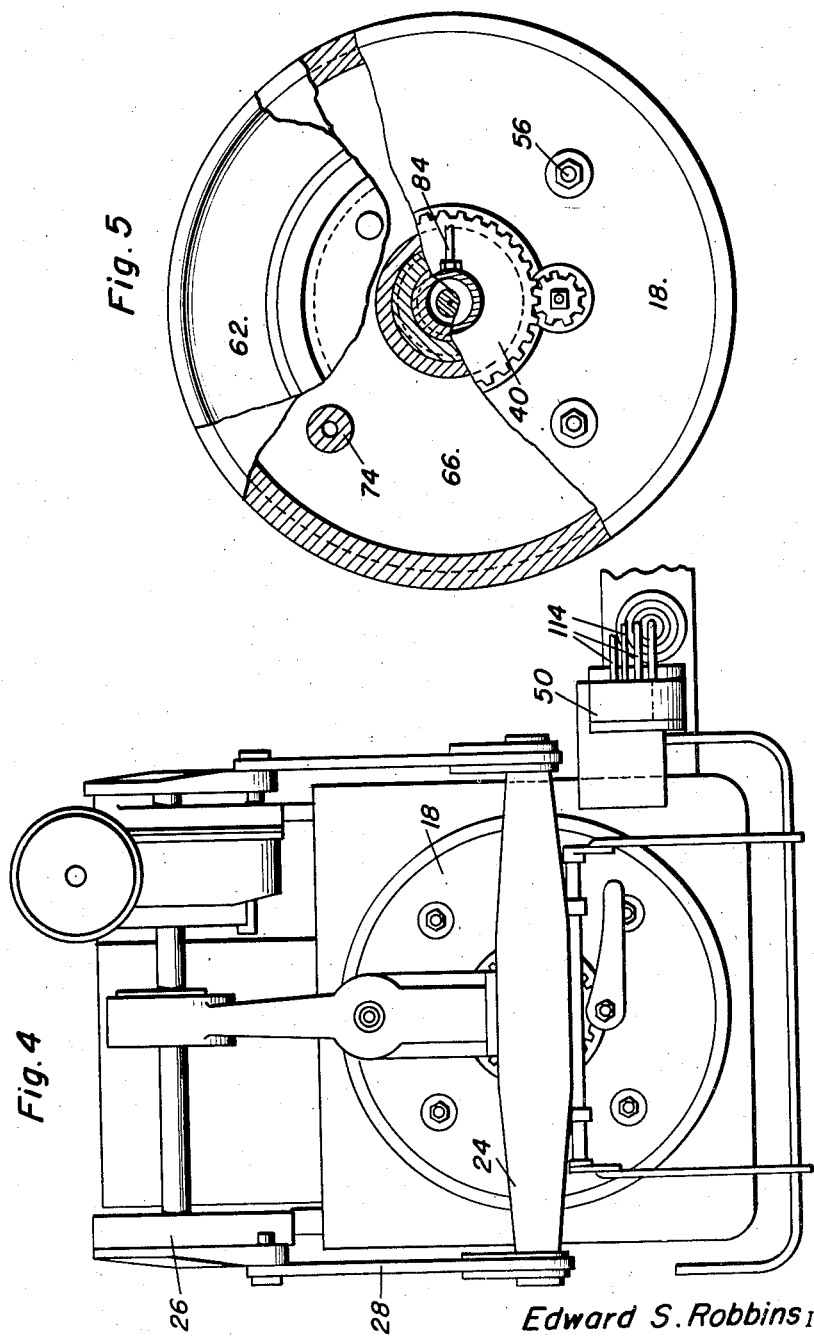

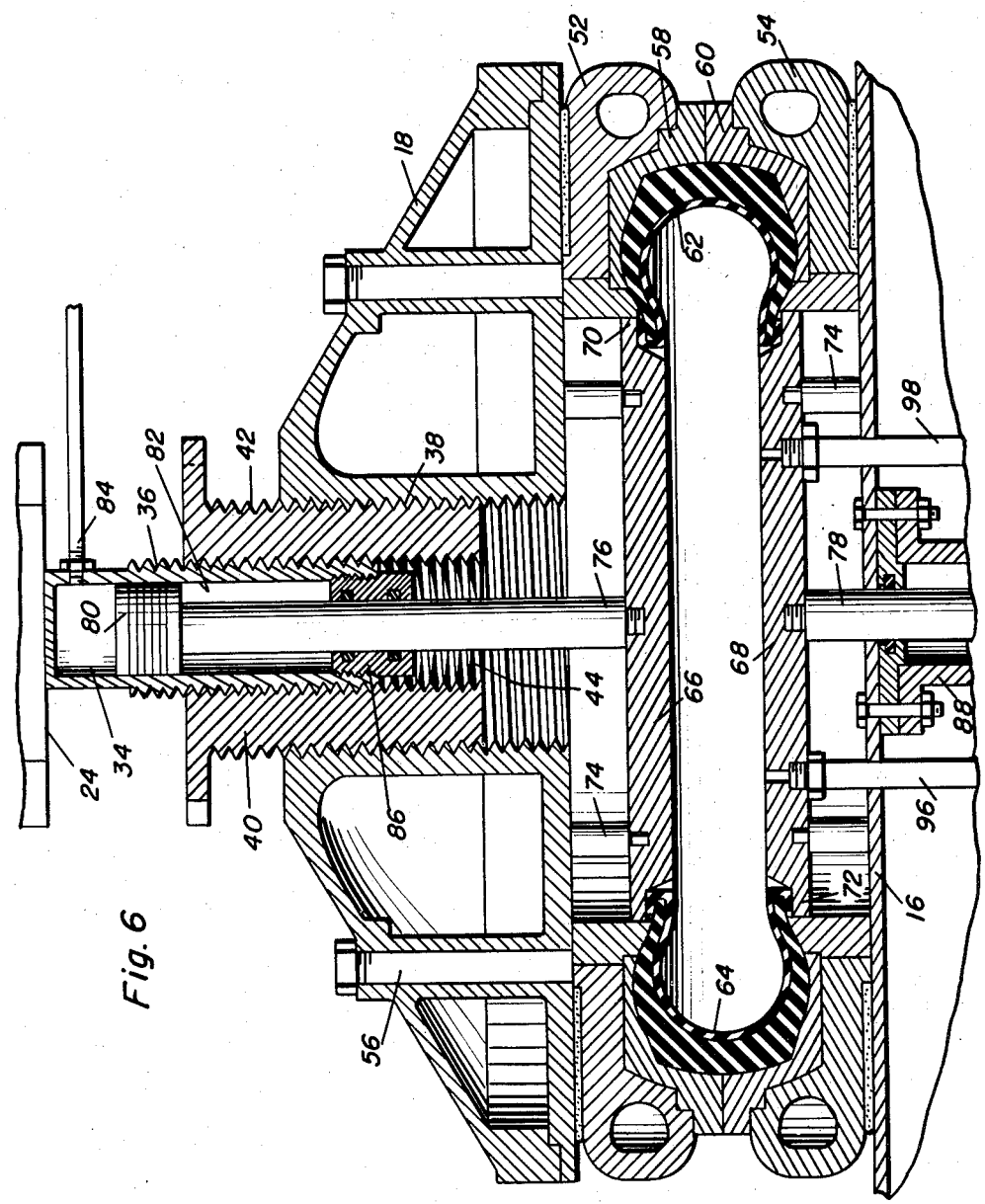

March 18, 1958 E. S. ROBBINS 2,826,783
QUICK ACTING TIRE RETREADING MOLD
Filed Nov. 22, 1954 5 Sheets-Sheet 5

Edward S. Robbins
INVENTOR.

United States Patent Office 2,826,783
Patented Mar. 18, 1958

2,826,783

QUICK ACTING TIRE RETREADING MOLD

Edward S. Robbins, Tuscumbia, Ala., assignor to Robbins Tire & Rubber Company, Inc., Tuscumbia, Ala., a corporation of Alabama Application November 22, 1954, Serial No. 470,212

9 Claims. (Cl. 18—18)

This invention comprises novel and useful improvements in a quick action tire retreading mold and more particularly pertains to improvements in the novel tire retreading mold disclosed in the copending applications of Eldridge S. White, Serial Nos. 376,804; 453,277; 454,132; 447,081; 453,817.

The primary object of this invention is to provide an improved tire retreading mold incorporating therein the principles of the aforesaid applications, but wherein automatic, quick acting opening and closing means shall be provided for the retreading mold.

A further object of the invention is to provide an apparatus wherein conventional automatic time-controlled and time-controlling mechanisms may be utilized to provide an entirely automatic operation of the aforesaid tire retreading molds of the above-mentioned applications.

A further important object of the invention is to provide a novel and improved means for modifying and adapting a conventional type of automatic press for use as a tire retreading mold in accordance with the novel principles and mechanisms of the aforesaid applications.

A still further and more specific object of this invention is to provide an improved manner whereby the tire sealing means of the aforesaid applications for patent may be incorporated in a compact and novel manner in the platens of a conventional quick acting automatic press.

And a final important object of the invention to be specifically enumerated herein resides in a novel manner of co-ordinating a conventional quick action press with the novel tire retreading mold of the aforesaid applications whereby to adapt and combine the advantages of both structures in a novel and improved manner and for operating upon the novel processes set forth in the aforesaid applications for patent.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Figure 1 is a front elevational view, parts being broken away, showing a preferred embodiment in accordance with this invention and wherein a conventional form of quick acting press has been modified and adapted for association therewith of a tire retreading mold in accordance with the copending application of E. S. White, Ser. No. 473,220, filed December 6, 1954, the parts of the press and of the mold apparatus being shown in the mold closed position as during the recapping and retreading of a tire therein;

Figure 2 is a side elevational view of the arrangement of Figure 1, the press and mold being shown in the mold closing position;

Figure 3 is a view similar to Figure 2 but showing the mold in the open position;

Figure 4 is a top plan view of the apparatus of Figure 1;

Figure 5 is a fragmentary horizontal sectional view, parts being broken away, of the upper platen of the press and the mold section attached thereto, being taken substantially upon the plane indicated by the section line 5—5 of Figure 1;

Figure 6 is a vertical central sectional view taken upon an enlarged scale substantially upon the plane indicated by the section line 6—6 of Figure 2 and showing the positions assumed by the cooperating portions of the press and of the molding apparatus when the mold is in its closed position during the recapping and retreading of a tire therein;

Figure 7:
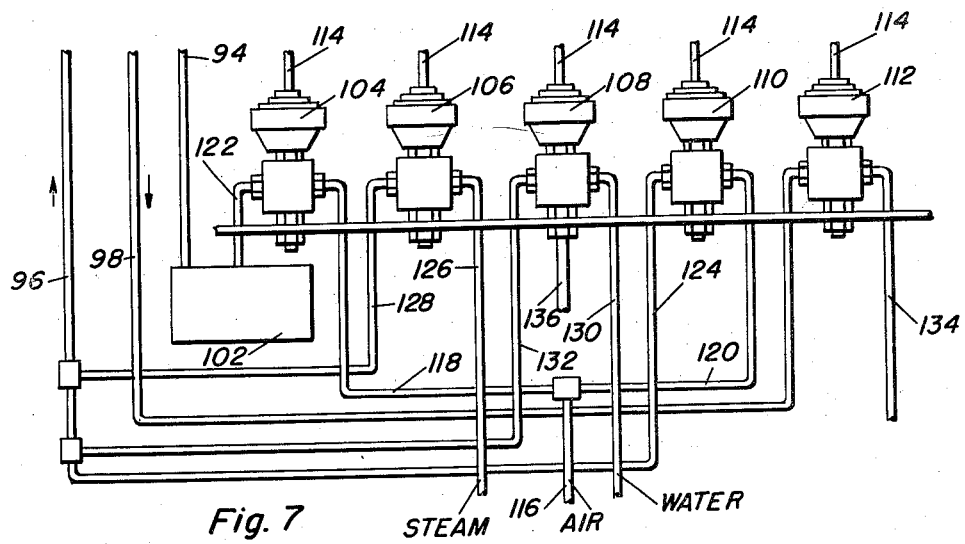
Figure 8:
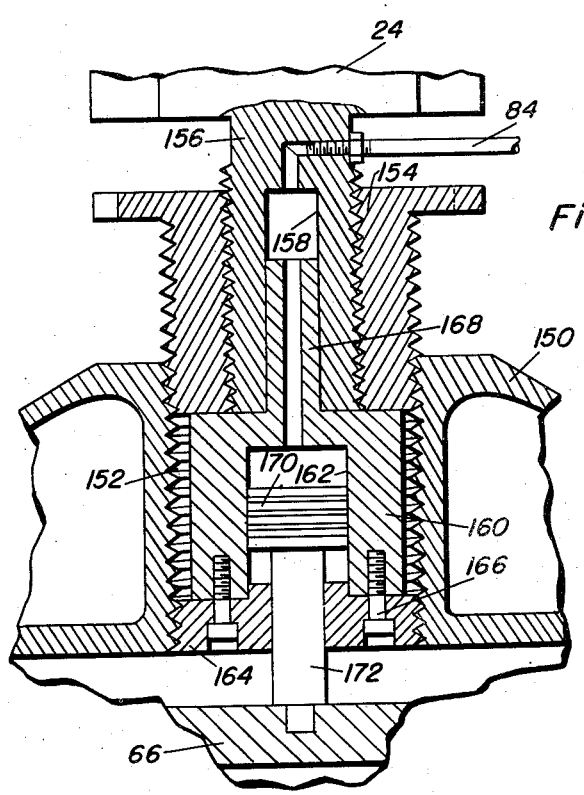

Figure 7 is a somewhat diagrammatic view and showing the various elements of the fluid systems controlled by the automatic timing mechanism and operating the press and the mold apparatus associated therewith; and Figure 8 is a fragmentary view similar to Figure 6 but showing a modification consisting of a replacement platen for the conventional movable platen of the press and having a further modification of the molding apparatus associated therewith.

In the accompanying drawings and in the following description, there are illustrated by way of example only two practical and preferred manners for practicing the principles of this invention. It is an essential feature of this invention to combine in a novel manner a conventional form of quick acting press and of a type which is capable of actuation by a conventional automatic timing device, with the improved recapping and retreading tire mold apparatus disclosed in the copending applications of E. S. White, Serial Nos. 376,804; 453,277; 454,132; 447,081; 453,817. In accordance with the present invention, all of the various advantages as to construction and operation set forth in the above-mentioned copending applications of E. S. White are obtained while at the same time the operation of the recapping apparatus is greatly improved with a greater certainty of operation in the closing of the mold sections, and with a saving in the time required to open and close the mold sections at the beginning of and after the completion of a recapping or retreading operation. In addition, the operation of the aforesaid tire retreading and recapping molds of the above-mentioned applications is greatly facilitated by so adapting a conventional, automatically operated press with the novel tire retreading apparatus as to enable completely automatic operation of the apparatus by certain adaptations to be set forth hereinafter of the quick acting conventional press construction.

Figure 1:
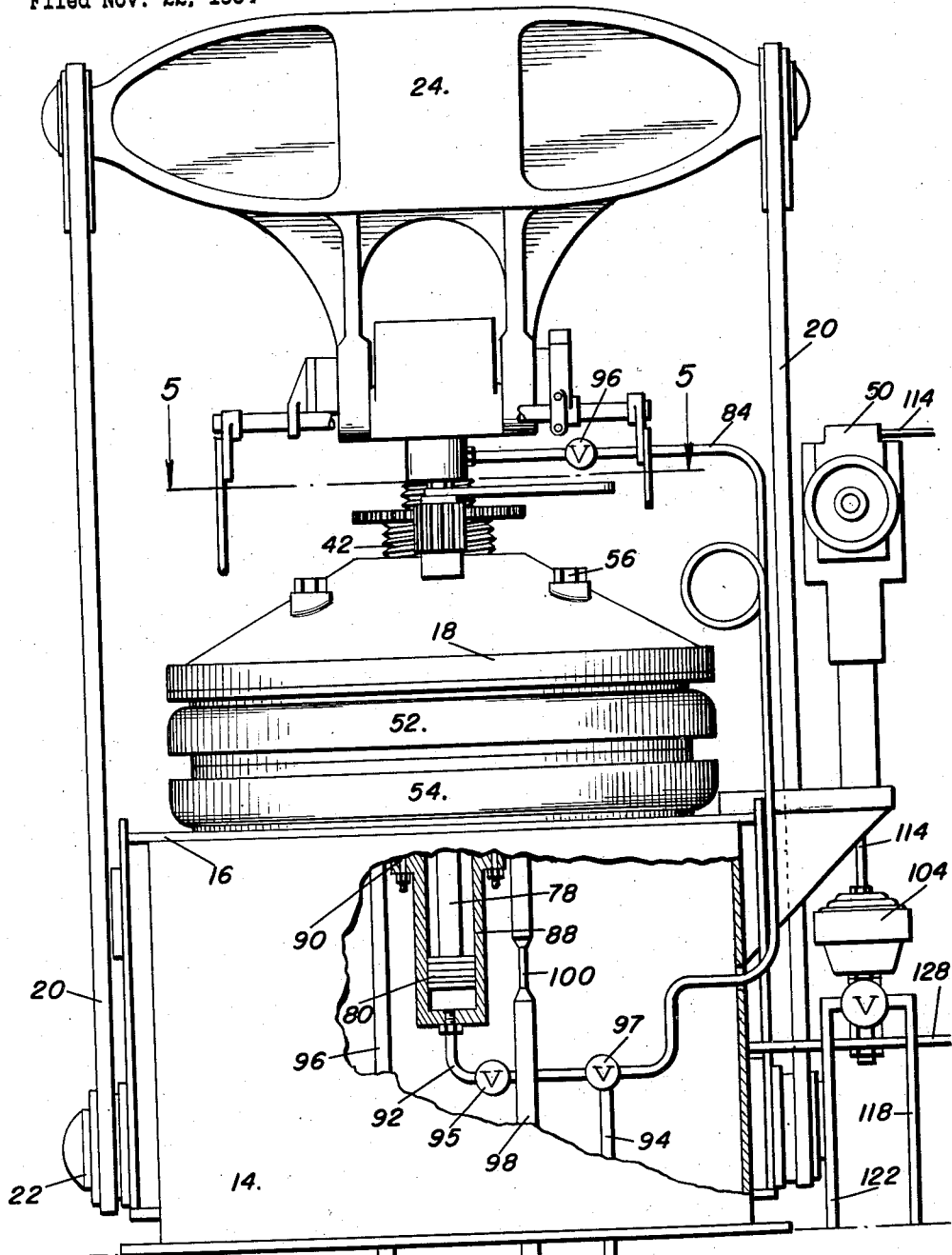

Reference is made first to Figures 1-7 of the drawings which disclose, by way of illustration, a novel and advantageous manner of combining a conventional press with a tire molding apparatus, particular reference being made to Figures 1-3 wherein a conventional press, indicated by the numeral 10, has associated therewith in a novel manner to be hereinafter described a tire recapping and retreading mold indicated generally by the numeral 12 and which may be of the type disclosed in the copending applications of E. S. White, above identified.

It is sufficient for the purposes of this invention to employ any suitable type of automatically controlled, quick acting press wherein the operation of the press may be automatically controlled through an automatic cyclic time-controlling mechanism of a conventional design. In the type of press illustrated, there is disclosed a base portion 14, see also Figure 6, upon which there is mounted a stationary platen 16, this base being of generally hollow construction. A movable platen 18 cooperates with the stationary platen 16 for movement towards and from the same. In the form of conventional press illustrated, the actuating means whereby the movable platen is moved towards and from the fixed platen consists of a pair of support arms 20 which, at their lower ends, are pivoted to the base 14 as by trunnions 22 for vertical swinging movement, a crosshead 24 being fixedly secured to the upper ends of these arms for movement therewith, as will be apparent by a comparison of Figures 1, 2 and 3. A crank or eccentric member 26 driven from any suitable power means is connected as by a connecting rod 28 and link 30 with trunnions 32 carried by the upper ends of the arms 20 whereby the latter may be oscillated towards and from a vertical position, as will be seen by a comparison of Figures 2 and 3. As will be more readily apparent from Figure 6, a connecting means is interposed between the crosshead 24 and the movable platen 18 whereby the latter is adjustably carried by the crosshead for movement therewith, towards and from the fixed platen, and whereby the distance of the movable platen from the fixed platen may be adjustably regulated. The form of connecting means utilized in this conventional type of press consists of a depending stem 34 which is carried by the crosshead and is externally threaded as at 36. In the conventional mechanism, this depending stem is solid, although the same is illustrated as being tubular in these drawings for a purpose which will be presently apparent.

The movable platen 18 is of hollow construction, having an internally threaded bore 38 in which is received an adjusting bushing 40. The latter is externally threaded, as at 42, for adjustable reception in the internally threaded bore 38, and in turn is provided with an internally threaded bore 44 in which is engaged the externally threaded portion 36 of the stem 34. It should be observed that the internal and external threads 44 and 42 of the bushing 40 are reversely arranged whereby, upon rotating the bushing 40 in one direction, the bushing will be screwed into the bore 38 and will also move the stem 34 inwardly of its bore 44, while in the other direction a reverse movement will occur. Thus, by rotating the bushing 40, a relatively rapid adjustment of the platen 18 with respect to the stem 34 will be effected.

Indicated generally by the numeral 50 is a conventional form of automatic timer or control for operation of the member 26 and whereby the arms 20 may be moved between the positions shown in Figures 2 and 3 to effect opening and closing movement of the press. The details of this automatic timer form no part of the present invention, and may be of any conventional design, it being sufficient for the purposes of this invention that this automatic control shall be capable of adaptation whereby, in addition to the opening and closing movement of the press itself in controllably timed relation in automatic cyclic operation, there may also be controlled various elements of the tire molding apparatus 12 when the latter is adapted for association with this form of conventional press.

In order to combine the conventional form of press with the tire recapping and retreading apparatus, the upper and lower mold sections 52 and 54 of the apparatus are respectively rigidly secured to the movable platen 18 as by the customary fastening bolts 56 provided with the latter, and to the fixed platen 16 by a similar means, not shown. Thus, upon movement of the platens towards and from each other, the mold sections will be opened and closed, as will be apparent from a comparison of Figures 1 and 6 with Figure 2.

Secured in the two mold sections 52 and 54 are the customary matrices 58 and 60 which may be interchanged in accordance with the size and type of tires to be recapped and/or retreaded by the molding apparatus. It is to be understood that the mold sections may be heated by steam in accordance with common practice for such molds.

Shown in Figure 6 is a tire casing 62 which has been prepared for retreading and/or recapping by the application of camelback thereto, and having a diaphragm or liner or sleeve 64 associated with the interior of the tire casing to render the same impervious to air, steam or the like. This sleeve may conveniently be of the construction disclosed and claimed in the copending applications of E. S. White, Serial Nos. 453,277; 454,132; and 376,804, and accordingly since the construction and operation of this form of diaphragm or liner has been fully disclosed and claimed therein, and in itself forms no part of the present invention, a further description and explanation of the same is deemed to be unnecessary for the purposes of disclosing the present invention.

A pair of sealing means in the form of plates or disks 66 and 68 are provided which have peripheral flanges 70 and 72 together with shouldered recesses for engaging the bead or rim portions of the diaphragm or sleeve and of the tire casing to establish an air-tight sealing engagement therewith. These sealing members are movable within the hollow central portions of the mold sections and are preferably provided with replaceable or interchangeable stop members 74 which are adapted to abut against the flat surfaces of the movable and fixed platens to thereby limit movement of the sealing members away from each other. These stops may be so adjusted and so chosen that the plates will be limited to movement away from each other until they assume a position best calculated for permitting the vulcanizing and curing of a given size of tire in the apparatus.

Each of the sealing members 66 and 68 is provided with an axially disposed rod 76 and 78, respectively, each of these rods being in turn provided with a piston 80, by which the rod is adapted to be operated. While only one piston, that for the rod 76, has been illustrated, it will be understood that a similar piston is provided for the rod 78.

In accordance with the present invention, the conventionally solid stem 34 by which the platen is secured to the crosshead of the conventional press is axially bored to provide a hollow cylinder 82 in which the piston 80 is slidably received. Adjacent the upper end of the cylindrical bore, an opening is tapped to receive the end of a conduit 84. The bottom end of the cylinder 82 is internally threaded and receives an externally threaded guide bushing 86 therein, by means of which the rod 76 is guided for sliding movement and whereby a seal is established for the cylinder 82.

A similar cylinder 88 is provided to slidably receive the piston 80 of the piston rod 78, this latter cylinder being secured in the hollow interior of the base portion 14 of the press, as by bolts 90. A fluid supply conduit 92 communicates with the lower cylinder 88 for operating the piston therein.

As so far described, it will be observed that no change is necessary in the conventional structure of the base of the conventional press other than to provide an aperture in the fixed platen through which the upper end of the rod 78 may slide, and to secure the operating cylinder 88 upon the bottom side of the platen 16 and in the hollow interior of the base 14. However, in adapting the movable mold section to the movable platen, it is necessary to either bore the solid stem 34 to provide a cylinder for the piston 80 of the upper sealing means 66 or to replace the same with a stem for this purpose.

Referring now specifically to Figure 1, it will be observed that the fluid pressure conduit 84 for the upper cylinder 82 is connected with the fluid pressure conduit 92 of the lower cylinder, and both of these conduits are connected to a supply conduit 94. It is preferred to provide flow-restricting valves or members 95 and 97 in the conduits 84 and 92, respectively, whereby to prevent sudden movements of the fluid pressure operated pistons 80 and of the sealing means 66 and 68 operatively connected therewith.

With further particular reference to Figure 6, it will be seen that there are provided a pair of conduits 96 and 98 which are connected to and extend through the sealing means 68. The conduit 98 has a restricted portion 100 which restricts flow of fluid therethrough. By means of the conduit 96 fluid may be supplied to the space between the sealing members 66 and 68, while the conduit 98 permits the exhaust of fluid from the space as set forth hereinafter.

Attention is now directed more specifically to Figure 7. In this diagrammatic view, it will be seen that the conduit 94 communicates with a reservoir 102 which contains a hydraulic fluid such as oil. When pressure is applied to the fluid in the reservoir 102, such fluid is displaced through the conduit 94 and then through the two conduits 92 and 84 to the operating means consisting of the cylinders 88 and 82, whereby their pistons, and consequently the attached sealing means 66 and 68, will be forced towards each other. When the pressure applied to the reservoir is released, fluid may return from the conduit 94 to the reservoir, permitting the cylinders and consequently their attached sealing means to be moved away from each other.

It will be further observed from Figure 7 that a plurality of conventional diaphragm actuated valves 104, 106, 108, 110, and 112 are provided, each having a conduit 114 which is connected with the automatic control mechanism 50 whereby the latter, at an appropriate timed interval in the cycle of operation of the control device will energize one of the diaphragm valves. A source of compressed air under any convenient pressure, as 140 lbs., is delivered by the conduit 116 to the branch conduits 118 and 120 which respectively communicate with one side of the diaphragm control valves 104 and 110. From the other side of the valve 104, a delivery line 122 supplies compressed air to the reservoir 102 to cause actuation of the operating means for the two sealing means 66 and 68. From the other diaphragm operated air control valve 110, a delivery conduit 124 communicates with the previously mentioned conduit 96 whereby compressed air is supplied to the interior of the tire 62 between the sealing members 66 and 68. By means of a supply conduit 126, steam is supplied from any suitable source and under any desired pressure, as for example at a pressure of about 80 lbs. to the diaphragm valve 106, and from thence is delivered by a supply conduit 128 to the above mentioned conduit 96, from whence the steam may be supplied to the interior of the tire in the space between the sealing means in order to apply heat to the interior of the tire for vulcanizing the same.

By means of a conduit 130, water from any suitable source and under any desired pressure is supplied to the diaphragm controlled valve 108, and from the latter is delivered by a supply conduit 132 to the above-mentioned conduit 96 for introduction into the interior of the tire in the space between the sealing plates. The diaphragm controlled valve 112 controls the exhaust of fluid from the interior of the tire and the space between the sealing means, being connected to the discharge conduit 98, and exhausting as by a conduit 134. In addition, water may be exhausted from the diaphragm control valve 108 as by a conduit 136.

The plurality of diaphragm controlled valves 104—112 are all connected to the automatic timer control means 50 in such a manner that the various valves will be called upon to perform their functions in properly timed cyclic relation. Since the construction of the control timer 50 and of the plurality of diaphragm valves controlled thereby is of conventional design and well understood by those skilled in the art, no further explanation is deemed to be necessary as to the construction and specific functioning of these valves. In the present invention, however, the correlation of the various diaphragm controlled valves to the various fluid circuits is such that the following cycle of operation of the apparatus may be automatically performed, it being understood that the actual time allocated to each portion or phase of the cycle may be regulated as desired.

The operation of this embodiment of the invention is as follows:

With the mold in the open position shown in Figure 3, it will be assumed that the cyclic operation is ready to begin. At this time, the diaphragm or liner sleeve 64 is inserted in the tire 62, in order to render the carcass of the tire impervious to air, steam or water, in the manner set forth and claimed in the copending application of E. S. White, Serial No. 451,132. The tire is then placed in the lower mold section 54. Since as set forth hereinafter, it is preferred to cause the tire, when vulcanized and cured, to cling to the lower mold section and be more easily released from the upper mold section, the matrix 58 of the latter may be coated with some suitable material which will lessen the tendency of the cured tire to cling thereto. With the tire in place in the lower mold section, it will be understood that the sealing means 66 and 68 are at a maximum distance away from each other, with the pistons 80 being at the outer ends of their respective cylinders 82 and 88.

At this time, the automatic timer 50 is placed into operation. Its first actuation is to operate the member 26, causing the inclined arms 20 to move to their vertical position and lower the movable platen and mold section attached thereto upon the fixed platen and mold section. Because of the proper adjustment of the bushing 40, a tight firm closing of the mold is obtained without the necessity for use of the customary manually actuated clamping bolts. Thus, the mold sections are very rapidly brought into closed position and maintained and locked in such position during the entire vulcanizing and curing operation, and are just as rapidly opened, when required by operation of the timer control 50, upon completion of the vulcanizing operation. The next step after the closing of the mold sections is the actuation of the diaphragm valve 104 to cause air to be supplied to the reservoir 102 and thus cause pressure fluid from that reservoir to energize the operating means whereby the two sealing means 66 and 68 are moved towards each other. This movement causes the periphery of these plates to establish a sealing engagement with the beads of the tire and of the diaphragm or sleeve liner of the tire, thereby sealing the interior of the tire and the space between the plates from the atmosphere.

The next step in the cycle of operation is the opening of the diaphragm valve 110 whereby compressed air is supplied by the line 124 to the conduit 96 and to the interior of the tire, this air serving to expand the tire tightly against the matrix and against the walls of the mold in preparation for the vulcanizing operation and also expands or drives the sealing members 66 and 68 away from each other to permit the beads of the tire and the side walls of the tire to expnad into the desired position for vulcanizing. It will be observed that this movement of the sealing means away from each other is limited by the adjustable or interchangeable stop members 74 contacting the adjacent surfaces of the fixed and movable platens. The stop members are so chosen that for a given size of tire, an appropriate and proper position of the sealing members 66 and 68 will be assured. During this outward movement of the sealing members 66 and 68, the pistons 80 move outwardly in their cylinders, displacing the hydraulic fluid back to the reservoir 102, the diaphragm valve 104 venting the air conduit 122 to permit this operation. At this time, a relatively low air pressure, as, for example, 40 lbs., is applied to the interior of the tire and its sealing means.

In the next phase of the operation of the automatic timer, the valve 106 is opened permitting steam to pass from the conduit 126 through the conduit 128 and the conduit 96 to the interior of the tire until the desired pressure of about 120 to 140 lbs. is maintained therein. The steam at this pressure will produce the requisite temperature and pressure to complete vulcanizing of the retreading material or camelback to the tread portion of the tire, and to the side walls of the tire in the retreading and recapping mold. It has been found that approximately ten to twelve minutes is sufficient for this vulcanization to be effected. It will be understood that during this period when steam is applied to the interior of the tire and the space between the plates, a slow escape of steam is permitted by a means, not shown, but such as that disclosed in the copending applications of E. S. White, above identified, whereby any steam condensate is removed and whereby steam is circulated through the tire for heating and vulcanizing the same.

It should be observed that it is an inherent advantage and characteristic of this form of apparatus that the heat of the steam is applied not only to the exterior or tread portion of the tire through the steam jacketed mold sections, but is also applied directly to the interior of the tire through a relatively much thinner carcass of the tire. With this application of heat to both sides of the tire, a much more rapid and much more thorough vulcanization of the retreading and recapping material to the tire carcass is effected, thereby very materially reducing the time customarily required to effect the vulcanizing operation.

After the predetermined time in which the circulation of steam for vulcanizing purposes has expired, the automatic timer 108 operates the valve 106 to cut off the flow of steam to the interior of the tire, and at the same time the valve 112 is closed, preventing escape of steam from the tire. Next, the valve 110 is actuated by the control timer 50 to cause the air supply from the conduit 116 to be delivered by the conduit 124 into the conduit 96 and thereby increase the pressure within the tire. While it is not absolutely essential to increase this pressure, it is deemed to be essential to prevent any diminution of the pressure when the steam supply is cut off. This additional supply of air into the steam already contained within the interior of the tire retains the desired pressure and temperature for a period of time sufficient to permit the curing operation, usually about ten to twelve minutes.

Upon completion of the predetermined time interval allotted for the curing operation, the supply of air through the valve 110 is cut off, cooling water at preferably a higher pressure is supplied by the conduit 130, the diaphragm valve 108, the conduit 132 and the inlet conduit 96 to the interior of the tire, while the discharge line 98 is opened by the diaphragm valve 112 to permit flow from the interior of the tire. During the cooling water injection, the pressure within the tire is preferably raised in order to avoid any appreciable reduction in pressure while the temperature in the tire is above the water boiling point. Since nearly all recapped tires have absorbed and retained water in the carcass because of previous nail holes or other breaks, a reduction of pressure inside the tire while the temperature is still above the boiling point would permit this absorbed water to flash into steam causing "blowouts" or separation of the camelback retread from the carcass. The cooling water is circulated at a safe maintained pressure until the temperature has dropped below the boiling point interval allotted for effectively lowering the temperature of the tire, the control timer 50 closes the water inlet diaphragm valve 108, whereby the water, air, and all of the pressure fluid inside the tire casing may be exhausted therefrom. Thereafter, the timer causes the actuation of the arms 20 to raise the upper press platen and the upper mold section, thereby opening the mold. Since, as above mentioned, provision has been made to prevent the tire from clinging to the upper mold section as closely as to the lower mold section, the upper mold section will be lifted from the tire which will remain in the lower mold section. Thereafter, the control timer 50 will cause the operation of the diaphragm valve 104 which will in turn cause actuation of the operating means and thus move the sealing plates 66 and 68 outwardly from their cylinders. Movement of the plate 68 will force the tire from its engagement with the lower mold section, thereby stripping the tire from the mold and permitting the tire to be readily removed.

It will be observed that in this automatic operation, very little attendance is required by the operator, since once the tire is placed in the apparatus, the entire sequence of operations required for the vulcanizing, curing and cooling of a tire are completed automatically. By virtue of the application of heat directed into the interior of the tire, the vulcanization and curing of the tire is effected in a minimum of time, and by applying a cooling means to the interior of the tire, the tire is quickly cooled in a minimum of time to permit its removal from the mold, without substantial heat loss from the mold, and whereby the next tire may be promptly placed therein to recommence the automatic cycle of operations.

In the embodiment illustrated and described in connection with Figures 1–7, it will be observed that a conventional press has been adapted to permit the installation therein of the novel tire recapping and retreading mold. In this adaptation, the operating means for the sealing means has been compactly housed in the lower portion of the conventional mold structure, and has been compactly housed in the upper or movable platen by being installed in the connecting means whereby that platen is secured to the actuating means of the press.

It is also possible, as shown in the embodiment of Figure 8, to provide a replacement platen for the movable platen 18, wherein a somewhat more compact arrangement is possible. In Figure 6, the replacement platen is indicated by the numeral 150 and is provided with the internally threaded bore 152 to receive the adjusting bushing 154 by means of which the replacement platen is mounted upon the stem 156 of the previously mentioned crosshead 24. This stem is provided with an axial bore forming a cylinder 158 with which the conduit 84 previously mentioned communicates. A cylinder consisting of a body 160 and having a cylinder 162 therein is secured in the threaded bore 152 by means of a closure plug 164 which is screw threaded into this bore, and to which the body 160 is secured as by fastening bolts 166. The upper end of the cylinder 162 communicates by means of the tubular stem 168 with the interior of the cylinder 158. Thus, fluid may flow between the conduit 84 and the cylinder 162.

Slidable in the cylinder 162 is a piston 170 provided with a rod 172 which is secured to the upper sealing means 66 in the same manner as the previously described rod 76 of the preceding embodiment. The operation of this form of the invention is identical with that previously described. However, the diameter of the cylinder 162 is no longer limited by the diameter of the stem 156, and a variation of this piston stroke length is of course possible.

It will be observed that in both of the embodiments disclosed, adjustment of the movable platen with respect to its crosshead 24, and consequently with respect to the fixed platen 16, is possible through the adjusting bushing 40 and 154, and this adjustment may be made without any detrimental effect upon the operation of the operating means for the sealing means mounted therein.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

What is claimed as new is as follows:

1. A quick acting tire retreading and recapping mold comprising fixed and movable platens, tire mold sections each secured to one of said platens, actuating means operatively connected to said movable platen for imparting quick acting movement thereto towards and from said fixed platen for effecting opening and closing movement of said mold sections, a tire sealing means carried by each platen and each operable to establish a seal with a bead of a tire disposed in said mold sections and to close the circular area defined by the tire bead from the atmosphere whereby to close the interior of a tire and the annular space lying within and between the tire beads from the atmosphere, operating means for moving said sealing means towards and from the beads of a tire and means for supplying fluid under pressure to the interior of a tire between said sealing means.

2. A quick acting tire retreading and recapping mold comprising fixed and movable platens, tire mold sections each secured to one of said platens, actuating means operatively connected to said movable platen for imparting quick acting movement thereto towards and from said fixed platen for effecting opening and closing movement of said mold sections, a tire sealing means carried by each platen and each operable to establish a seal with a bead of a tire disposed in said mold sections and to close the circular area defined by the tire bead from the atmosphere whereby to close the interior of a tire and the annular space lying within and between the tire beads from the atmosphere, operating means for moving said sealing means towards and from the beads of a tire, means mounted upon said sealing means for supplying fluid under pressure to the interior of a tire between said sealing means.

3. The combination of claim 2 wherein the operating means for the sealing means carried by said movable platen is carried thereby.

4. The combination of claim 2 wherein said actuating means includes a connecting means engaging said movable platen, the operating means for the sealing means carried by said movable platen being disposed in and carried by said connecting means.

5. The combination of claim 2 wherein said actuating means includes a connecting means engaging said movable platen, the operating means for the sealing means carried by said movable platen being disposed in and carried by said connecting means, said connecting means constituting means for adjustably positioning the movable platen relative to the fixed platen.

6. A quick acting tire retreading and recapping mold comprising fixed and movable platens, tire mold sections each secured to one of said platens, actuating means operatively connected to said movable platen for imparting quick acting movement thereto towards and from said fixed platen for effecting opening and closing movement of said mold sections, a tire sealing means carried by each platen and each operable to establish a seal with a bead of a tire disposed in said mold sections and to close the circular area defined by the tire bead from the atmosphere whereby to close the interior of a tire and the annular space lying within and between the tire beads from the atmosphere, operating means for moving said sealing means towards and from the beads of a tire, said operating means including fluid pressure operated members operatively associated with each sealing means, means for applying fluid pressure to said members for causing the latter to establish a seal with the beads of a tire, means carried by said sealing means for applying a fluid under pressure to the interior of a tire between said sealing means for expanding the tire in the mold sections and moving the tire beads with their engaged sealing means away from each other.

7. A quick acting tire retreading and recapping mold comprising fixed and movable platens, tire mold sections each secured to one of said platens, actuating means operatively connected to said movable platen for imparting quick acting movement thereto towards and from said fixed platen for effecting opening and closing movement of said mold sections, a tire sealing means carried by each platen and each operable to establish a seal with a bead of a tire disposed in said mold sections and to close the circular area defined by the tire bead from the atmosphere whereby to close the interior of a tire and the annular space lying within and between the tire beads from the atmosphere, operating means for moving said sealing means towards and from the beads of a tire, said operating means including fluid pressure operated members operatively associated with each sealing means, means for applying fluid pressure to said members for causing the latter to establish a seal with the beads of a tire, means carried by said sealing means for applying a fluid under pressure to the interior of a tire between said sealing means for expanding the tire in the mold sections and moving the tire beads with their engaged sealing means away from each other, including stop means for limiting movement of said sealing means away from each other.

8. A quick acting tire retreading and recapping mold comprising fixed and movable platens, tire mold sections each secured to one of said platens, actuating means operatively connected to said movable platen for imparting quick acting movement thereto towards and from said fixed platen for effecting opening and closing movement of said mold sections, a tire sealing means carried by each platen and each operable to establish a seal with a bead of a tire disposed in said mold sections and to close the circular area defined by the tire bead from the atmosphere whereby to close the interior of a tire and the annular space lying within and between the tire beads from the atmosphere, operating means for moving said sealing means towards and from the beads of a tire, said operating means including fluid pressure operated members operatively associated with each sealing means, means for applying fluid pressure to said members for causing the latter to establish a seal with the beads of a tire, means carried by said sealing means for applying a fluid under pressure to the interior of a tire between said sealing means for expanding the tire in the mold sections and moving the tire beads with their engaged sealing means away from each other, said actuating means including a fluid pressure actuated device, an automatic control means operable in automatic sequence for controlling activation of said actuating means and of said operating means by control of the fluid pressure applied thereto.

9. A quick acting tire retreading and recapping mold comprising fixed and movable platens, tire mold sections each secured to one of said platens, actuating means operatively connected to said movable platen for imparting quick acting movement thereto towards and from said fixed platen for effecting opening and closing movement of said mold sections, a tire sealing means carried by each platen and each operable to establish a seal with a bead of a tire disposed in said mold sections and to close the circular area defined by the tire bead from the atmosphere whereby to close the interior of a tire and the annular space lying within and between the tire beads from the atmosphere, operating means for moving said sealing means towards and from the beads of a tire, means carried by said sealing means for supplying fluid under pressure to the interior of a tire between said sealing means, an automatic control means operably associated with said actuating means, said operating means and said fluid supply means whereby in automatic sequence the actuating means will be energized to close the mold sections, the operating means will be energized to move the sealing means towards each other and into sealing engagement with the tire beads, and the fluid supplying means will be caused to supply vulcanizing and curing fluid into the interior of the tire.

References Cited in the file of this patent

UNITED STATES PATENTS

| | | |
|---|---|---|
| 1,989,364 | Iverson | Jan. 29, 1935 |
| 2,279,540 | Voth et al. | Apr. 14, 1942 |
| 2,358,763 | Soderquist | Sept. 19, 1944 |
| 2,495,664 | Soderquist | Jan. 24, 1950 |
| 2,699,572 | Soderquist | Jan. 18, 1955 |
| 2,734,225 | Glynn | Feb. 14, 1956 |